United States Patent
Tzou et al.

(10) Patent No.: US 11,360,508 B2
(45) Date of Patent: Jun. 14, 2022

(54) ELECTRONIC DEVICE WITH SLIDING SCREENS

(71) Applicants: Jyh-Chyang Tzou, Taipei (TW); Han-Tsai Liu, Taipei (TW); Pai-Feng Chen, Taipei (TW); Cheng-Shiue Jan, Taipei (TW); I-Hao Chen, Taipei (TW)

(72) Inventors: Jyh-Chyang Tzou, Taipei (TW); Han-Tsai Liu, Taipei (TW); Pai-Feng Chen, Taipei (TW); Cheng-Shiue Jan, Taipei (TW); I-Hao Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 128 days.

(21) Appl. No.: 17/000,385

(22) Filed: Aug. 24, 2020

(65) Prior Publication Data

US 2021/0089083 A1    Mar. 25, 2021

Related U.S. Application Data

(60) Provisional application No. 62/905,390, filed on Sep. 25, 2019.

(51) Int. Cl.
*G06F 1/16* (2006.01)

(52) U.S. Cl.
CPC .......... *G06F 1/1624* (2013.01); *G06F 1/1616* (2013.01); *G06F 1/1647* (2013.01); *G06F 1/1681* (2013.01)

(58) Field of Classification Search
CPC ...... G06F 1/1624; G06F 1/162; G06F 1/1647; G06F 1/1681
See application file for complete search history.

(56) References Cited

U.S. PATENT DOCUMENTS

| 10,641,318 | B2* | 5/2020 | Siddiqui | F16C 11/04 |
| 10,860,065 | B2* | 12/2020 | Seibert | G06F 1/1618 |
| 11,099,706 | B1* | 8/2021 | Iyer | G06F 3/0227 |
| 2018/0329508 | A1* | 11/2018 | Klein | G06F 1/1641 |
| 2019/0394894 | A1* | 12/2019 | Kim | H05K 5/0226 |
| 2020/0365110 | A1* | 11/2020 | Iyer | G06F 3/147 |

FOREIGN PATENT DOCUMENTS

| CN | 102113298 | 6/2011 |
| CN | 102598093 | 7/2012 |

OTHER PUBLICATIONS

"Office Action of Taiwan Counterpart Application", dated Dec. 10, 2020, p. 1-p. 8.

* cited by examiner

*Primary Examiner* — Anthony Q Edwards
(74) *Attorney, Agent, or Firm* — JCIPRNET

(57) ABSTRACT

An electronic device with sliding screens including a first body, a second body, a plurality of hinge modules, a first screen and a second screen is provided. The first body has a first surface. The second body has a second surface. The hinge modules are connected between the first body and the second body. The first screen is slidably disposed on the first surface of the first body. The second screen is slidably disposed on the second surface of the second body. When the first body and the second body are unfolded to a first angle relative to each other, the first screen and the second screen are moved relatively close and lifted upwards. When the first body and the second body are unfolded to a second angle relative to each other, the first screen and the second screen are in contact with each other to cover the hinge modules.

20 Claims, 12 Drawing Sheets

ELECTRONIC DEVICE WITH SLIDING SCREENS

CROSS-REFERENCE TO RELATED APPLICATION

This application claims the priority benefit of U.S. provisional application No. 62/905,390, filed on Sep. 25, 2019. The entirety of the above-mentioned patent application is hereby incorporated by reference herein and made a part of this specification.

TECHNICAL FIELD

The invention relates to an electronic device, and more particular, to an electronic device with sliding screens.

BACKGROUND

Existing electronic devices such as smart phones, tablets, and laptops have been developed to include models with two screens. In addition to expanding a screen display range, the effect of the two screens can also replace a physical keyboard, and thereby reduce a thickness of an electronic device. The electronic device may be unfolded or folded. In an unfolded state, the two screens can output images synchronously or individually. In a folded state, the two screens are stacked up and down to reduce the volume for storage.

However, hinge modules of the existing electronic device with the two screens are mostly installed between the two screens so that the two screens can be turned relative to the hinge modules. When the two screens of the electronic device are unfolded relative to each other, there will be a separation distance between the two screens, so that the two screens cannot achieve a continuous display effect when outputting images, resulting in a poor viewing effect of the images. In addition, the hinge modules will also be exposed between the two screens, making the unfolded electronic device unsightly.

SUMMARY

The invention provides an electronic device with sliding screens, which includes two screens. In an unfolded state, a separation distance between the two screens can be reduced, so that the two screens form a seamless continuous display effect. In addition, the hinge modules can also be covered to improve its aesthetic level.

An electronic device with sliding screens of the invention includes a first body, a second body, a plurality of hinge modules, a first screen and a second screen. The first body has a first surface. The second body has a second surface. The hinge modules are connected between the first body and the second body. The first screen is slidably disposed on the first surface of the first body. The second screen is slidably disposed on the second surface of the second body. When the first body and the second body are unfolded to a first angle relative to each other, the first screen and the second screen are adapted to be moved relatively close and lifted upwards. When the first body and the second body are unfolded to a second angle relative to each other, the first screen and the second screen are in contact with each other to cover the hinge modules. The first screen and the second screen are adapted to be stacked in parallel and moved away from the hinge modules when the first body and the second body are folded relative to each other.

An electronic device with sliding screens of the invention includes a first body, a second body, a plurality of hinge modules, a first screen and a second screen. The first body has a first surface. The second body has a second surface. The hinge modules are connected between the first body and the second body. The first screen is disposed on the first surface of the first body. The second screen is disposed on the second surface of the second body. The first screen moves close to the second screen or the second screen moves close to the first screen and the first screen is lifted upwards relative to the first surface or the second screen is lifted upwards relative to the second surface when the first body and the second body are unfolded to a first angle. When the first body and the second body are unfolded to a second angle relative to each other, the first screen and the second screen are in contact with each other to cover the hinge modules.

Based on the above, the electronic device with sliding screens of the invention has the first screen and the second screen that can slide. The first screen and the second screen are adapted to be moved relative to the hinge module individually or synchronously. When the first body and the second body are unfolded relative to each other, the first screen and the second screen may be moved close to each other to achieve a seamless and continuous display effect. In addition, the first screen and the second screen may be lifted upwards to cover the hinge modules, thereby improving the aesthetic level for the electronic device.

DETAILED DESCRIPTION

Figure 1A:
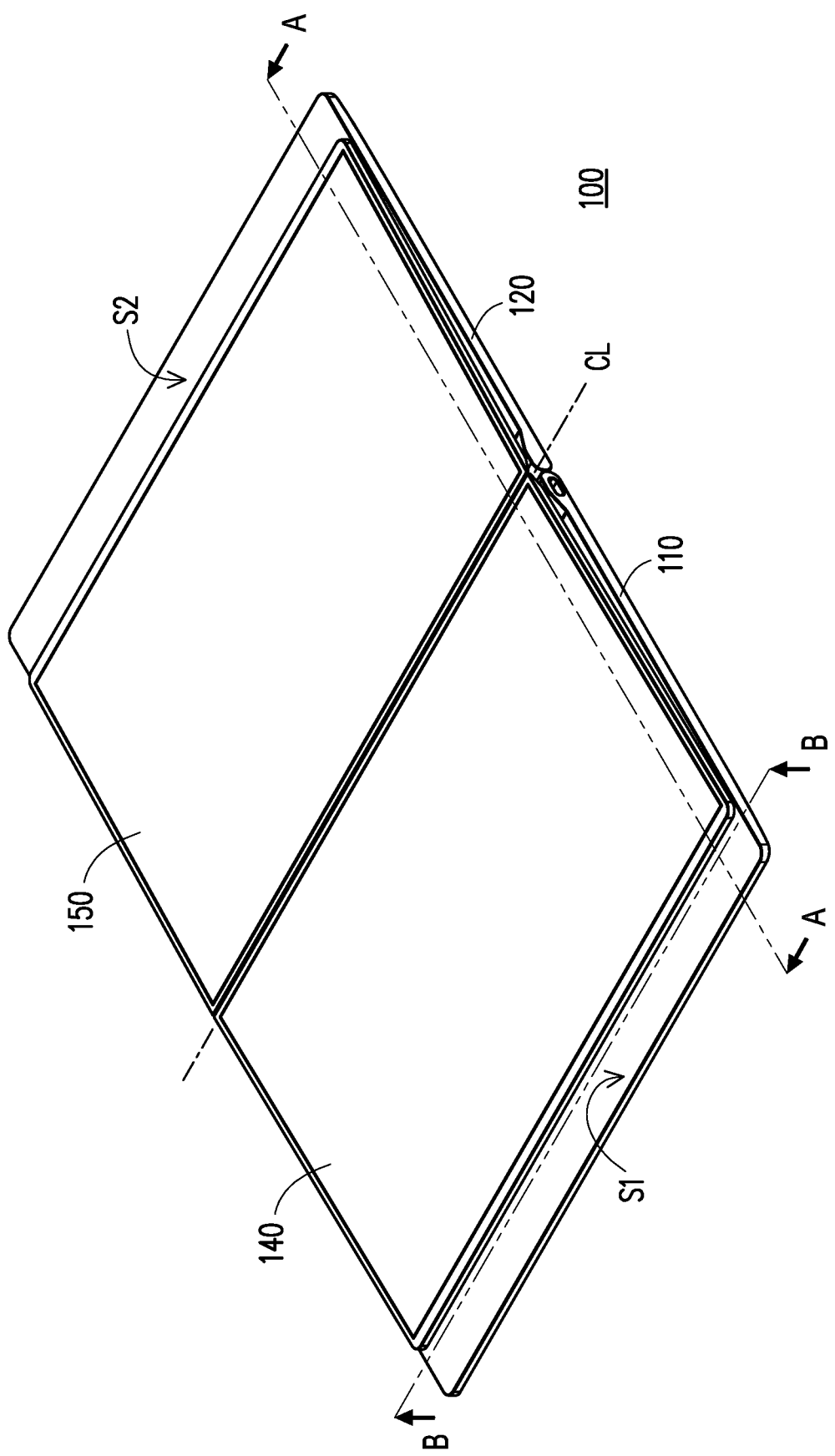
FIG. 1A is a 3D view of an electronic device with sliding screens in an unfolded state according to an embodiment of the invention.
Figure 1B:
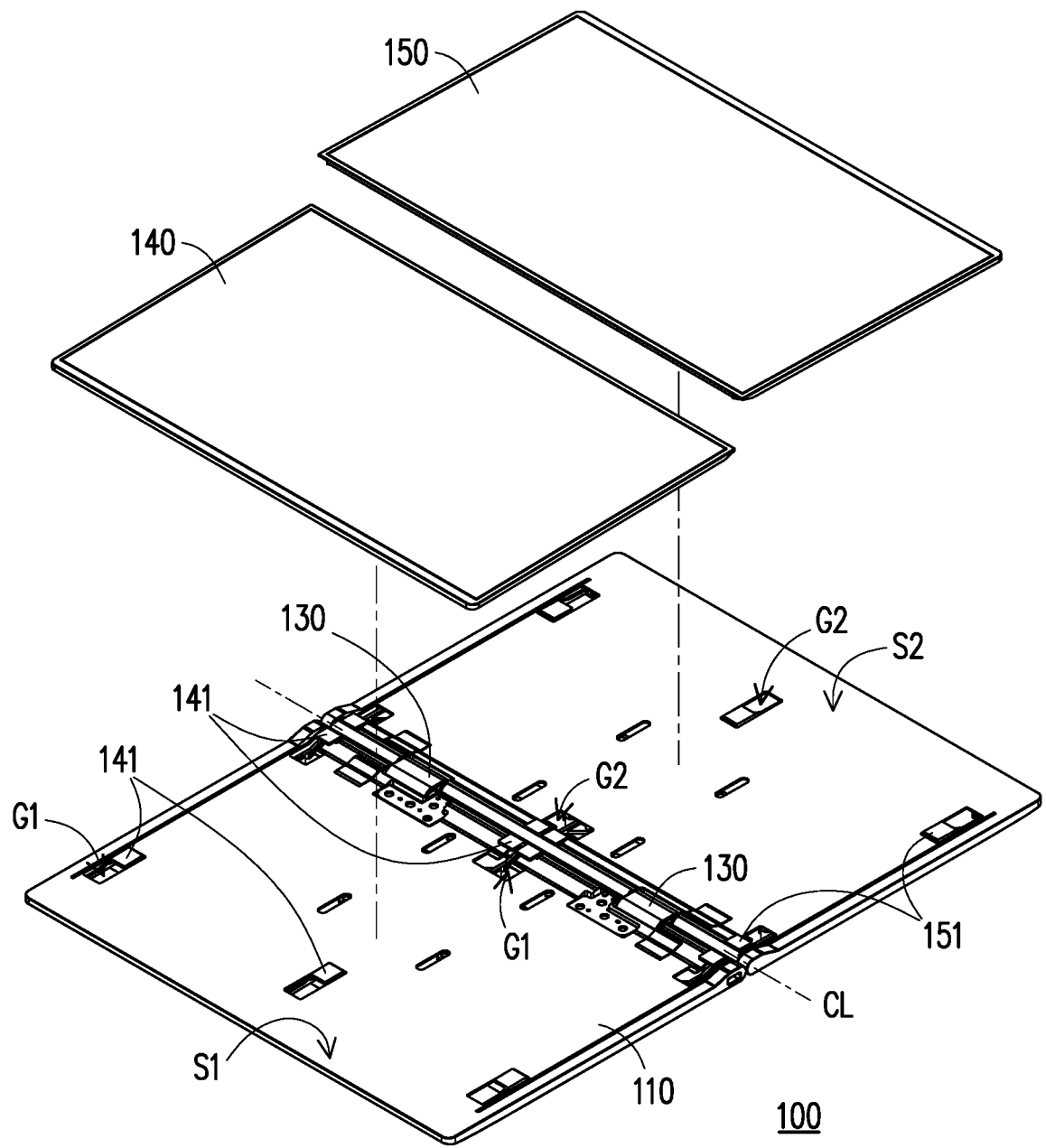
FIG. 1B is an explosion view of certain components in the electronic device with sliding screens of FIG. 1A.
Figure 2A:
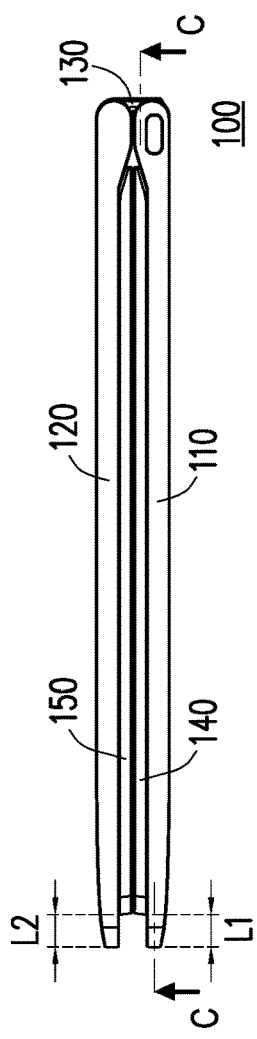
FIG. 2A is a side plan view of the electronic device with sliding screens of FIG. 1A in a folded state.
Figure 2B:
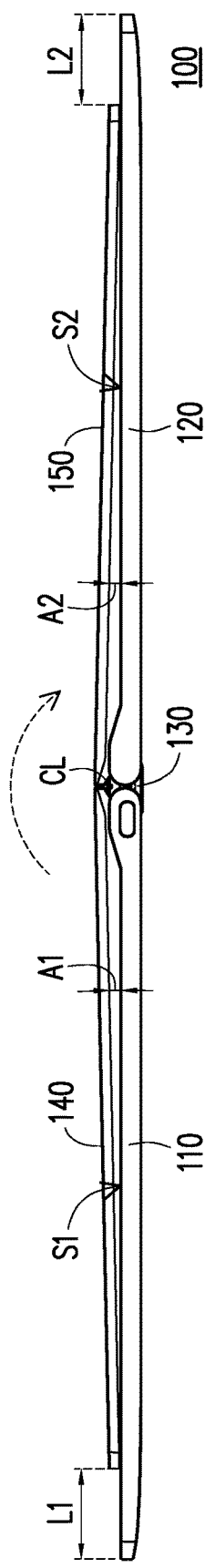
FIG. 2B is a side plan view of the electronic device with sliding screens of FIG. 1A unfolded to 180 degrees.
Figure 2C:
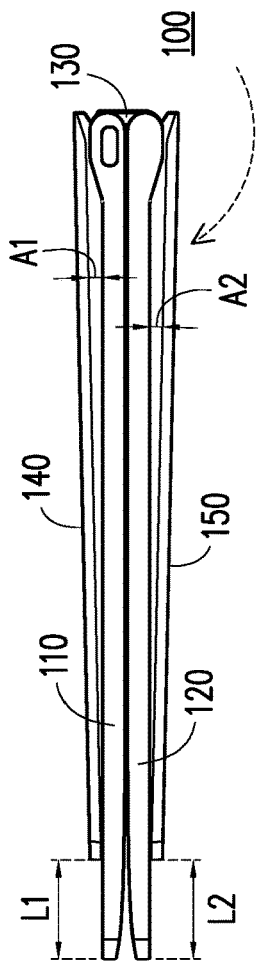
FIG. 2C is a side plan view of the electronic device with sliding screens of FIG. 1A unfolded to 360 degrees.

FIG. 1A is a 3D view of an electronic device with sliding screens in an unfolded state according to an embodiment of the invention. FIG. 1B is an explosion view of certain components in the electronic device with sliding screens of FIG. 1A. FIG. 2A is a side plan view of the electronic device with sliding screens of FIG. 1A in a folded state. FIG. 2B is a side plan view of the electronic device with sliding screens of FIG. 1A unfolded to 180 degrees. FIG. 2C is a side plan view of the electronic device with sliding screens of FIG. 1A unfolded to 360 degrees.

Referring to FIG. 1A and FIG. 1B, an electronic device 100 with sliding screens of the present embodiment includes a first body 110, a second body 120, a plurality of hinge modules 130, a first screen 140 and a second screen 150.

Referring to FIG. 2A to FIG. 2C together, the first body 110 has a first surface S1. The second body 120 has a second surface S2. The hinge modules 130 (shown as two in the drawing) are connected between the first body 110 and the second body 120, so that the first body 110 and the second body 120 are adapted to relatively turn and switch to the unfolded state (see FIG. 2B and FIG. 2C) or the folded state (see FIG. 2A). The first screen 140 is slidably disposed on the first surface S1 of the first body 110. The second screen 150 is slidably disposed on the second surface S2 of the second body 120. Referring to FIG. 2B, when the first body 110 and the second body 120 are unfolded to a first angle (e.g., 20 degrees) relative to each other, the first screen 140 and the second screen 150 are moved relatively close and lifted upwards relative to the first surface S1 and the second surface S2. When the first body 110 and the second body 120 are unfolded to a second angle (e.g., 180 degrees) relative to each other, the first screen 140 and the second screen 150 are in contact with each other to cover the hinge modules 130. Referring to FIG. 2A, when the first body 110 and the second body 120 are folded relative to each other, the first screen 140 and the second screen 150 are adapted to be stacked in parallel and moved away from the hinge modules 130.

In addition, referring to FIG. 2C, when the first body 110 and the second body 120 are unfolded to 360 degrees relative to each other, the first body 110 and the second body 120 are adapted to be stacked in parallel. When the first body 110 and the second body 120 are unfolded to less than 180 degrees relative to each other, the electronic device 100 with sliding screens may be switched to a tent mode. That is, the first body 110 and the second body 120 may stand up on a plane, and the first screen 140 and the second screen 150 respectively face different directions.

Further, the first screen of the invention is, for example, adjusted manually. For instance, when the first body and the second body are unfolded to 180 degrees relative to each other, the first screen is moved towards the second screen and lifted relative to the first body, and the second screen remains unmoved. In this way, a distance between the first screen and the second screen may be reduced to a minimum, and vice versa. For example, the first screen may remain unmoved, and the second screen may be moved towards the first screen and lifted relative to the second body.

More specifically, the first screen and the second screen of the invention are moved towards each other through manual adjustment, thereby minimizing the distance between the first screen and the second screen.

Figure 3A:
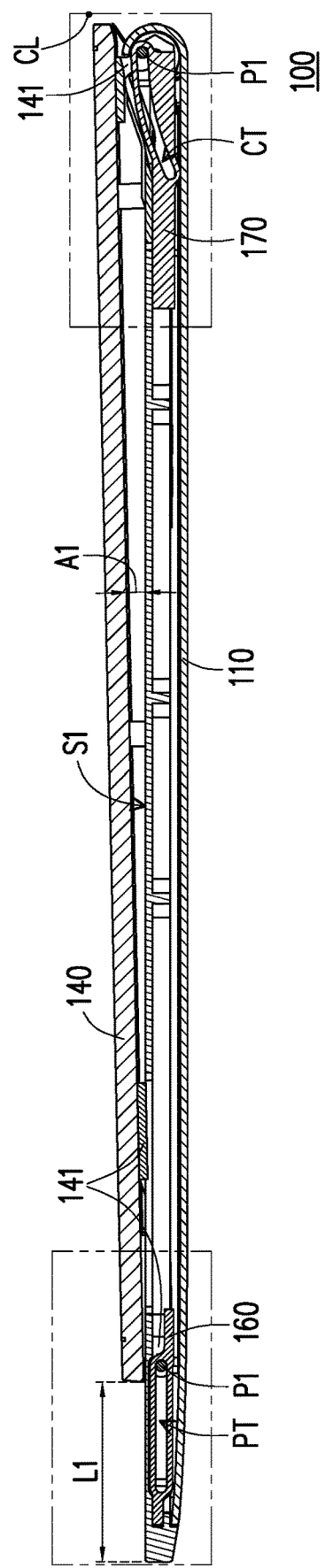
FIG. 3A is a cross-sectional view of the electronic device with sliding screens of FIG. 1A along a line segment A-A.
Figure 3B:
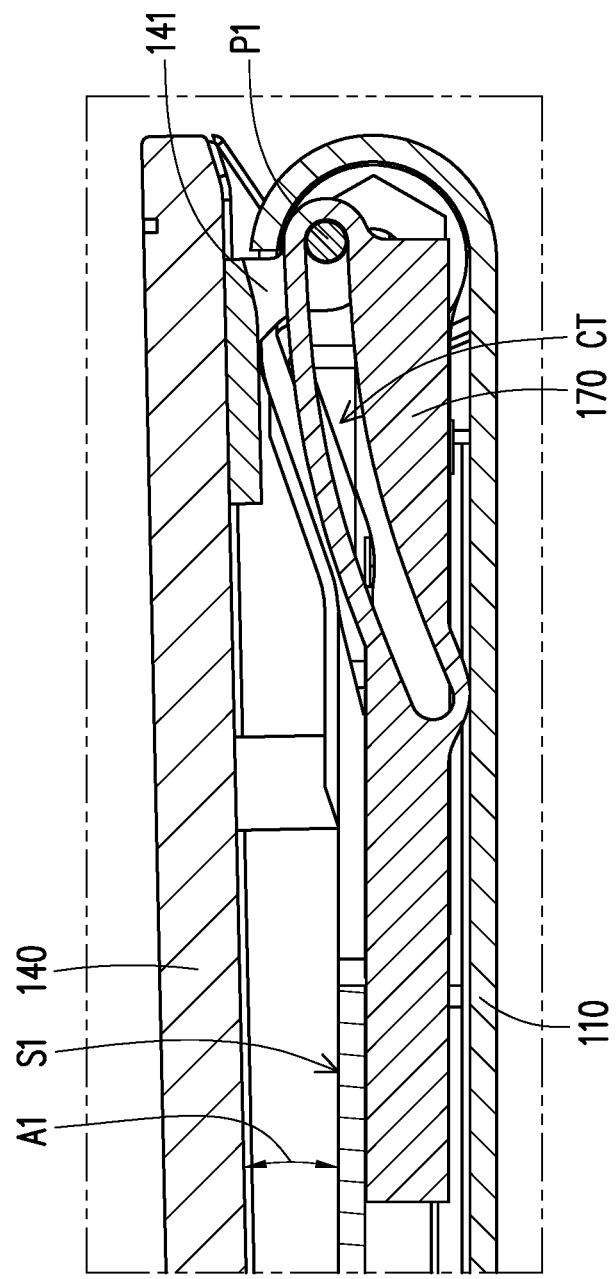
FIG. 3B is a partially enlarged view of the electronic device with sliding screens of FIG. 3A.
Figure 3C:
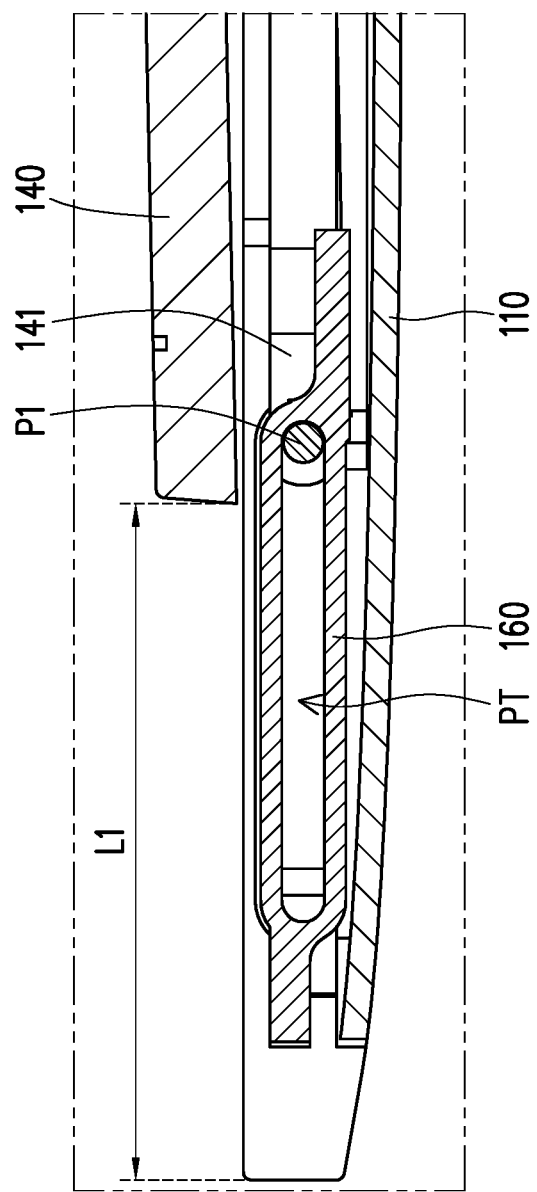
FIG. 3C is another partially enlarged view of the electronic device with sliding screens of FIG. 3A.
Figure 3D:
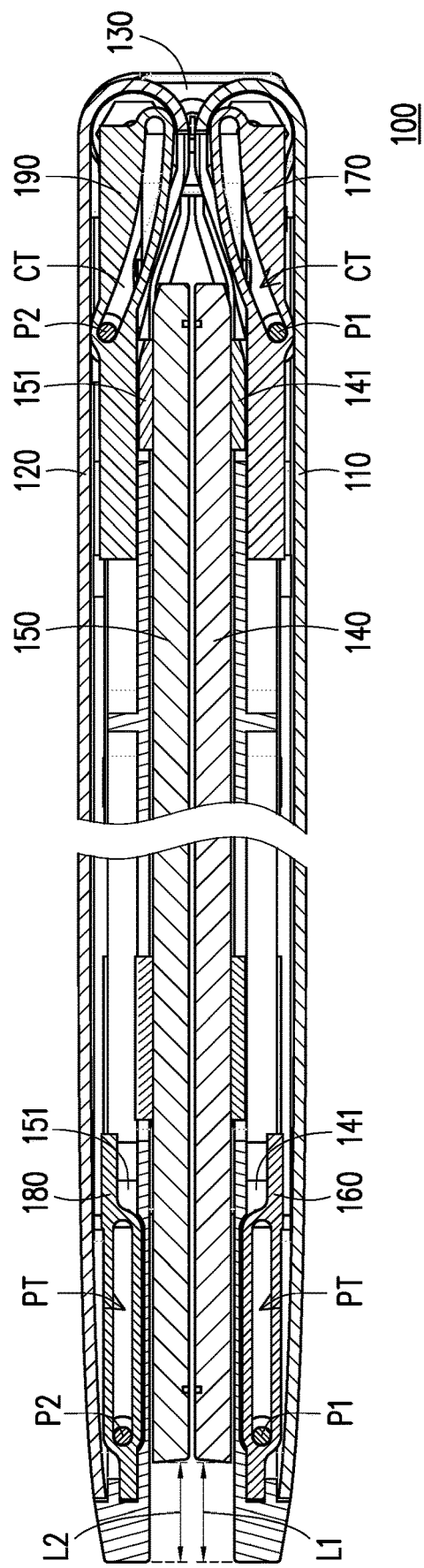
FIG. 3D is a cross-sectional view of the electronic device with sliding screens of FIG. 2A.

FIG. 3A is a cross-sectional view of the electronic device with sliding screens of FIG. 1A along a line segment A-A. FIG. 3B is a partially enlarged view of the electronic device with sliding screens of FIG. 3A. FIG. 3C is another partially enlarged view of the electronic device with sliding screens of FIG. 3A. FIG. 3D is a cross-sectional view of the electronic device with sliding screens of FIG. 2A.

Figure 4A:
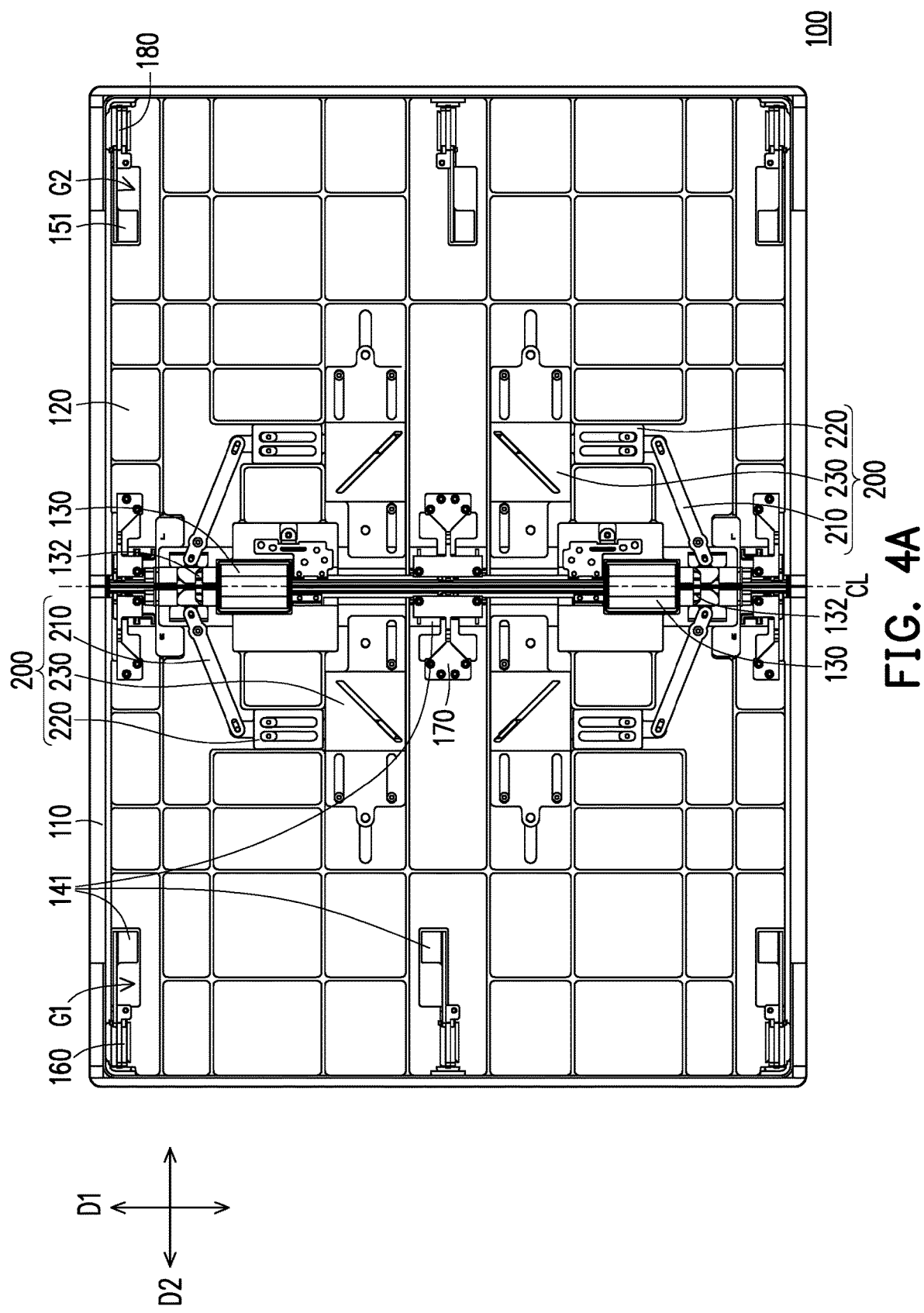
FIG. 4A is a cross-sectional view of the electronic device with sliding screens of FIG. 1A along a line segment B-B.
Figure 4B:
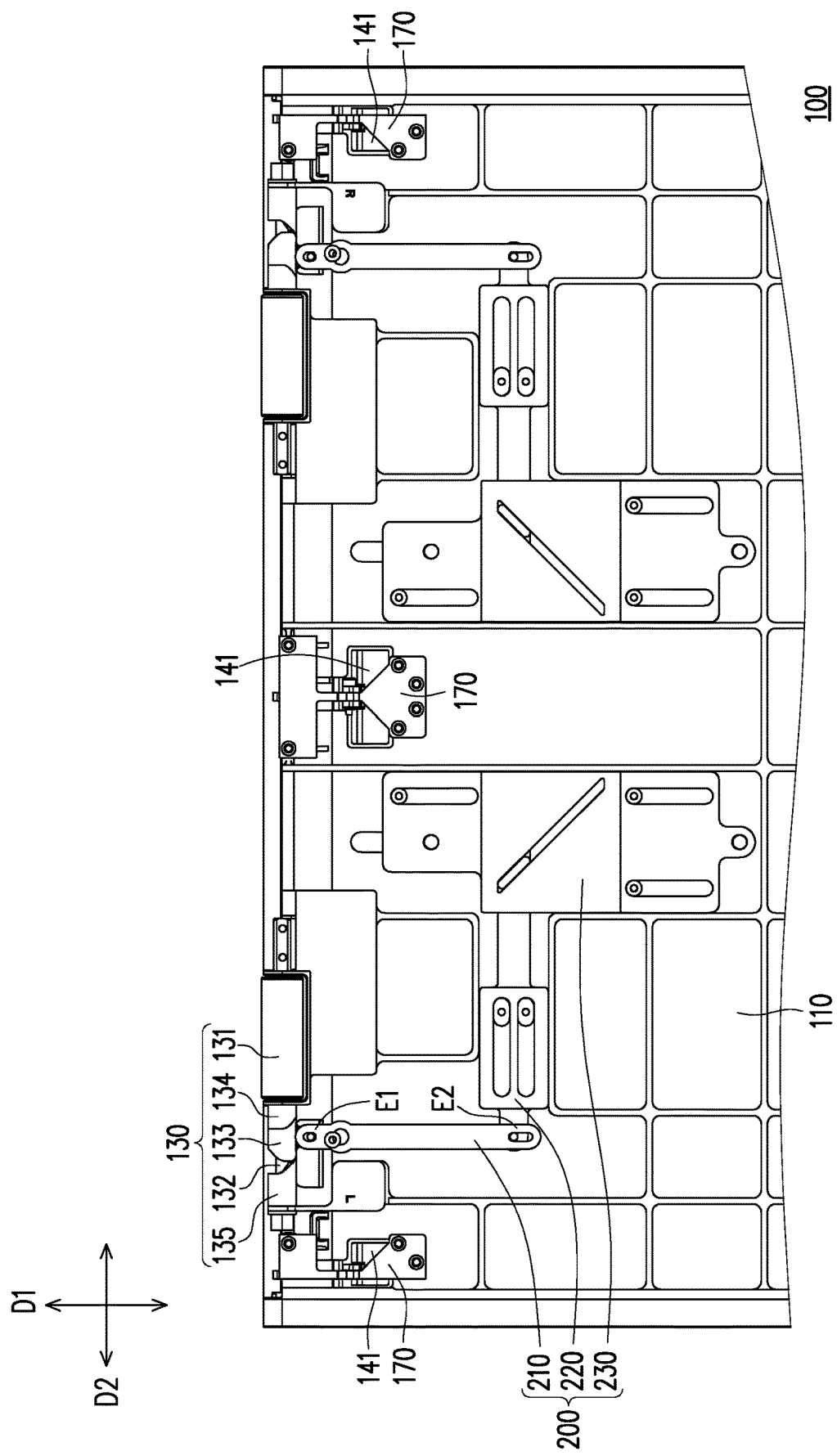
FIG. 4B is a cross-sectional view of the electronic device with sliding screens of FIG. 2A along a line segment C-C.

FIG. 4A is a cross-sectional view of the electronic device with sliding screens of FIG. 1A along a line segment B-B. FIG. 4B is a cross-sectional view of the electronic device with sliding screens of FIG. 2A along a line segment C-C.

Referring to FIG. 1B and FIG. 4A together, the first body 110 has a plurality of first grooves G1 formed on and penetrating the first surface S1. The first screen 140 has a plurality of first sliders 141 respectively and slidably disposed in the first grooves G1, and the first sliders 141 are adapted to slide linearly along the corresponding first grooves G1.

Referring to FIG. 2B and FIG. 3A to FIG. 3C together, the electronic device 100 with sliding screens of the invention includes a plurality of first translation bases 160 and a plurality of first lifting bases 170. The first translation bases 160 are disposed in the first body 110 and relatively away from the two hinge modules 130. The first lifting bases 170 are disposed in the first body 110 and relatively close to the two hinge modules 130. Each of the first translation bases 160 has a horizontal track PT. Each of the first lifting bases 170 has a curved track CT. A plurality of first plugs P1 of the first sliders 141 are respectively and movably inserted to the corresponding horizontal tracks PT and the corresponding curved tracks CT.

Referring to FIG. 2B and FIG. 3A, when the first body 110 and the second body 120 are unfolded relative to each other, the first screen 140 slides towards the second screen 150 along the horizontal tracks PT and the curved tracks CT through the first sliders 141, and the first screen 140 is lifted relative to the first surface S1 to form a first included angle A1. Here, a first distance L1 of the first screen 140 relative to the first body 110 gradually increases as the first included angle A1 increases.

Referring to FIG. 2A and FIG. 3D, when the first body 110 and the second body 120 are folded relative to each other, the first screen 140 slides away from the second screen 150 along the horizontal tracks PT and the curved tracks CT through the first sliders 141, and the first screen 140 is dropped relative to the first surface S1 to be parallel with each other. Here, the first distance L1 of the first screen 140 relative to the first body 110 gradually decreases as the first included angle A1 decreases.

Referring to FIG. 1B and FIG. 4A together, the second body 120 has a plurality of second grooves G2 formed on and penetrating the second surface S2. The second screen 150 has a plurality of second sliders 151 respectively and slidably disposed in the second grooves G2, and the second sliders 151 are adapted to slide linearly along the corresponding second grooves G2.

Referring to FIG. 2B and FIG. 3A to FIG. 3C together, the electronic device 100 with sliding screens of the invention includes a plurality of second translation bases 180 and a plurality of second lifting bases 190. The second translation bases 180 are disposed in the second body 120 and relatively away from the two hinge modules 130. The second lifting bases 190 are disposed in the second body 120 and relatively close to the two hinge modules 130. Each of the second translation bases 180 has a horizontal track PT. Each of the second lifting bases 190 has a curved track CT. A plurality of second plugs P1 of the second sliders 151 are respectively and movably inserted to the horizontal tracks PT and the curved tracks CT.

Referring to FIG. 2B and FIG. 3A, when the first body 110 and the second body 120 are unfolded relative to each other, the second screen 150 slides towards the first screen 140 along the horizontal tracks PT and the curved tracks CT through the second sliders 151, and the second screen 150 is lifted relative to the second surface S2 to form a second included angle A2. Here, a second distance L2 of the second screen 150 relative to the second body 120 gradually increases as the second included angle A2 increases.

Referring to FIG. 2A and FIG. 3D, when the first body 110 and the second body 120 are folded relative to each other, the second screen 150 slides away from the first screen 140 along the horizontal tracks PT and the curved tracks CT through the second sliders 151, and the second screen 150 is dropped relative to the second surface S2 to be parallel to each other. Here, the second distance L2 of the second screen 150 relative to the second body 120 gradually decreases the second included angle A2 decreases.

Referring to FIG. 2A to FIG. 2C, in the electronic device 100 with sliding screens of the invention, the first screen 140 and the second screen 150, for example, slide synchronously. When the first body 110 and the second body 120 are unfolded to 180 degrees relative to each other, the first screen 140 and the second screen 150 synchronously move towards a center line CL between the first body 110 and the second body 120 as the first body 110 and the second body 120 are unfolded. In this way, the distance between the first screen 140 and the second screen 150 may be reduced to the minimum. In detail, when the first body 110 and the second body 120 are unfolded to 180 degrees relative to each other, the first screen 140 and the second screen 150 respectively cover left and right halves of the hinge modules 130 and are aligned at the center Line CL.

Referring to FIG. 2C, when the first body 110 and the second body 120 are unfolded to 360 degrees relative to each other, the first body 110 and the second body 120 are stacked in parallel, and the first distance L1 of the first screen 140 relative to the first body 110 and the second distance L2 of the second screen 150 relative to the second body 120 remain unchanged.

Referring to FIG. 4A and FIG. 4B, the electronic device 100 with sliding screens of the invention further includes a plurality of linkage assemblies 200 respectively disposed in the first body 110 and the second body 120 and respectively connected to the corresponding two hinge modules 130. In this embodiment, one hinge module 130 is connected to two linkage assemblies 200. The linkage assemblies 200 link the first screen 140 and the second screen 150. When the first body 110 and the second body 120 are unfolded relative to each other, the two hinge modules 130 synchronously drive the first screen 140 and the second screen 150 through the linkage assemblies 200 to move relatively close to the center line CL between the first body 110 and the second body 120. When the first body 110 and the second body 120 are folded relative to each other, the two hinge modules 130 synchronously drive the first screen 140 and the second screen 150 through the linkage assemblies 200 to move relatively away form the center line CL between the first body 110 and the second body 120.

Figure 5A:
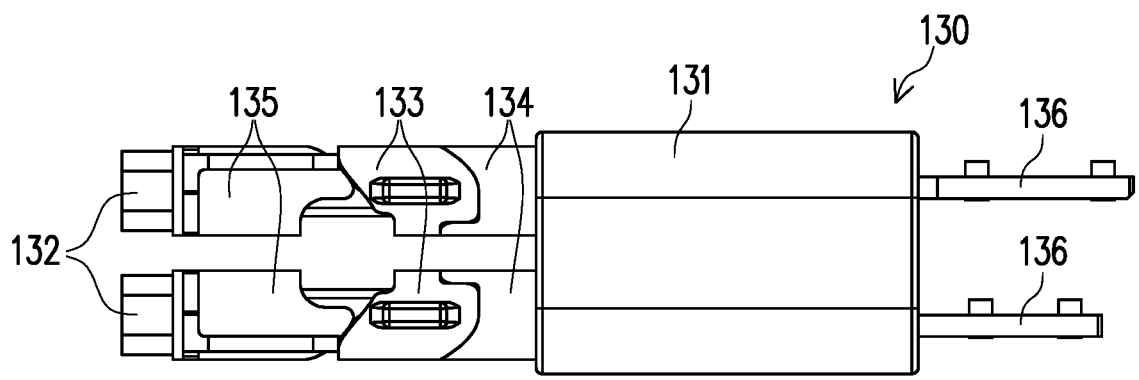
FIG. 5A to FIG. 5C are schematic views illustrating a turning operation of hinge modules of FIG. 2A to FIG. 2C.
Figure 5B:
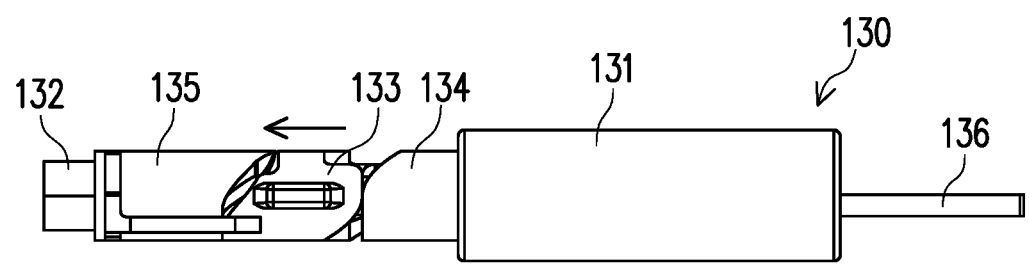
Figure 5C:
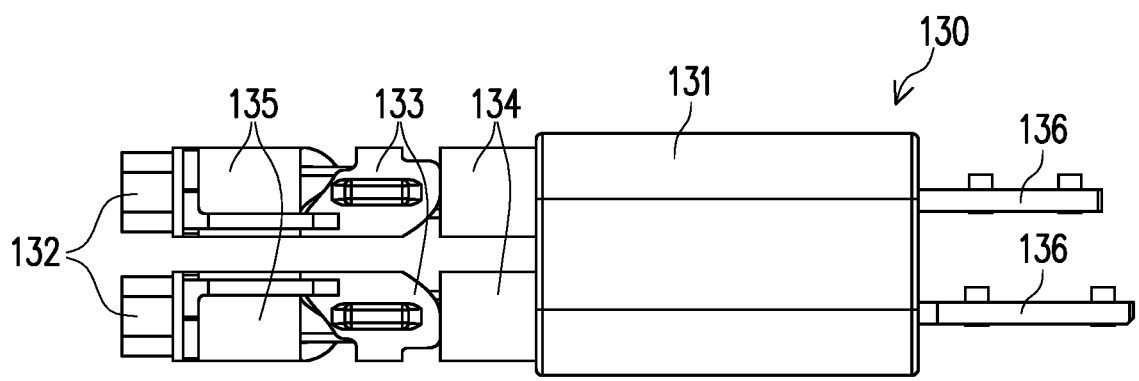

FIG. 5A to FIG. 5C are schematic views illustrating a turning operation of hinge modules of FIG. 2A to FIG. 2C.

Referring to FIG. 4A, FIG. 5A and FIG. 5B, each of the hinge modules 130 includes a torque member 131, two rotating shafts 132, two driving rings 133, two inner rings 134, two outer rings 135 and two brackets 136. The two rotating shafts 132 are rotatably inserted to the torque member 131 and parallel to each other. The two driving rings 133 are respectively and movably sleeved on the two rotating shafts 132 and connected to the corresponding two linkage assemblies 200. The two inner rings 134 are respectively sleeved on the two rotating shafts 132, and each of the inner rings 134 contacts one side of the respective driving ring 133 facing towards the torque member 131. The two outer rings 135 are respectively sleeved on the two rotating shafts 132, and each of the outer rings 135 contacts another side of the respective driving ring 133 facing away from the torque member 131. The two brackets 136 are respectively disposed on one end of the two rotating shafts 134 away from the two inner rings 134 and connected to the first body 110 and the second body 120.

Referring to FIG. 4A and FIG. 5A, when the first body 110 and the second body 120 are unfolded to 180 degrees relative to each other, each of the inner rings 134 and each of the outer rings 135 push the respective driving ring 133 to move away from the torque member 131 along the respective rotating shaft 131. Referring to FIG. 4B and FIG. 5B, when the first body 110 and the second body 120 are folded relative to each other, each of the inner rings 134 and each of the outer rings 135 push the respective driving ring 133 to move close to the torque member 131 along the respective rotating shaft 132.

Referring to FIG. 5C and FIG. 2C, when the first body 110 and the second body 120 are unfolded to 360 degrees relative to each other, each of the driving rings 133 is still maintained at a position where the respective rotating shaft 132 is relatively away from the respective torsion member 131, and will not move.

Referring to FIG. 4A and FIG. 4B, each of the linkage assemblies 200 includes a linking rod 210, a linking bracket 220 and a driving bracket 230. A first end E1 of the linking rod 210 is pivotally connected to the corresponding driving ring 133. The linking bracket 220 is pivotally connected to a second end E2 of the linking rod 210 and adapted to move along a first direction D1 parallel to each of the rotating shafts 132. The driving bracket 230 is slidably connected to the linking bracket 220 and adapted to move along a second direction D2 perpendicular to the first direction D1. The linking bracket 230 is connected to the first screen 140 or the second screen 150.

In brief, when the first body 110 and the second body 120 are unfolded relative to each other, each of the rotating shafts 132 correspondingly drives the respective inner ring 134 and the respective outer ring 135 to pivot, so as to push the respective driving ring 133 to move away from the respective torque member 131. Meanwhile, each of the torque members 131 pulls the respective linking rod 210 to make the respective linking bracket 220 slide along the first direction D1 and move away from an outer edge of the first body 110 or the second body 120. Then, each of the linking brackets 220 makes the respective driving bracket 230 to slide along the second direction D2 and move close to the hinge module 130. Finally, the linking brackets 220 synchronously and correspondingly drive the first screen 140 and second screen 150 to move linearly along the first groove G1 and the second groove G2 to be relatively close to the center line CL (see FIG. 1A), and vice versa. That is, when the first body 110 and the second body 120 are folded relative to each other, the above-mentioned operation flow is reversed, and details regarding to the same will not be repeated below.

Figure 6A:
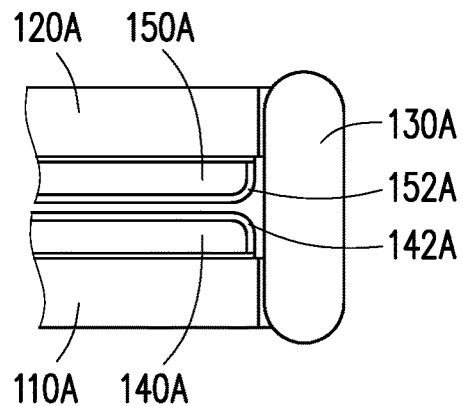
FIG. 6A is a plane view of an electronic device with sliding screens in a folded state according to another embodiment of the invention.
Figure 6B:
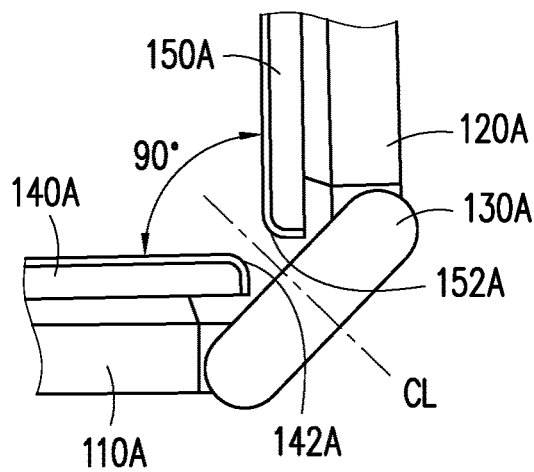
FIG. 6B is a plan view of the electronic device with sliding screens of FIG. 6A unfolded to 90 degrees.
Figure 6C:
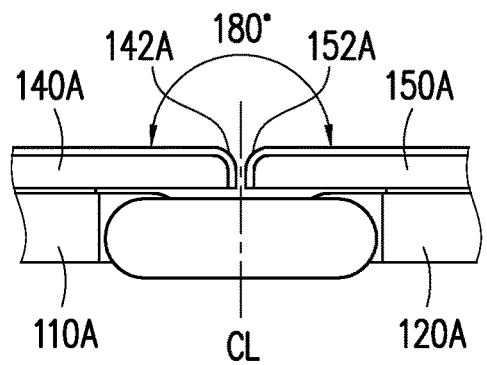
FIG. 6C is a plan view of the electronic device with sliding screens of FIG. 6A unfolded to 180 degrees.

FIG. 6A is a plane view of an electronic device with sliding screens in a folded state according to another embodiment of the invention. FIG. 6B is a plan view of the electronic device with sliding screens of FIG. 6A unfolded to 90 degrees. FIG. 6C is a plan view of the electronic device with sliding screens of FIG. 6A unfolded to 180 degrees.

Referring to FIG. 6A to FIG. 6B, an electronic device 100A with sliding screens of this embodiment is similar to the electronic device 100 with sliding screens shown by FIG. 1A. The difference is that a first screen 140A and a second screen 150A respectively include a first curved portion 142A and a second curved portion 152A. When the first body 110A and the second body 120A are folded relative to each other (see FIG. 6A), the first curved portion 142A and the second curved portion 152A face hinge modules 130A. When the first body 110A and the second body 120A are unfolded relative to each other, the first curved portion 142A and the second curved portion 152A are moved close to each other towards a center line CL between the first body 110A and the second body 120A.

In short, the first curved portion 142A and the second curved portion 152A are formed on opposite sides of the first screen 140A and the second screen 150A near the center line CL. In this embodiment, the first screen 140A and the second screen 150A move synchronously towards the center line CL, so that the first screen 140A and the second screen 150A may be in contact with each other to achieve a seamless effect.

Referring to FIG. 6B and FIG. 6C, when the first body 110A and the second body 120A are unfolded to 90 degrees and 180 degrees relative to each other, the hinge modules 130A may be hidden by the first curved portion 142A and the second curved portion 152A approaching 130A moved close to each other, so that the first screen 140A and the second screen 150A can have a preferable visual continuity between 90 degrees to 180 degrees.

Figure 7A:
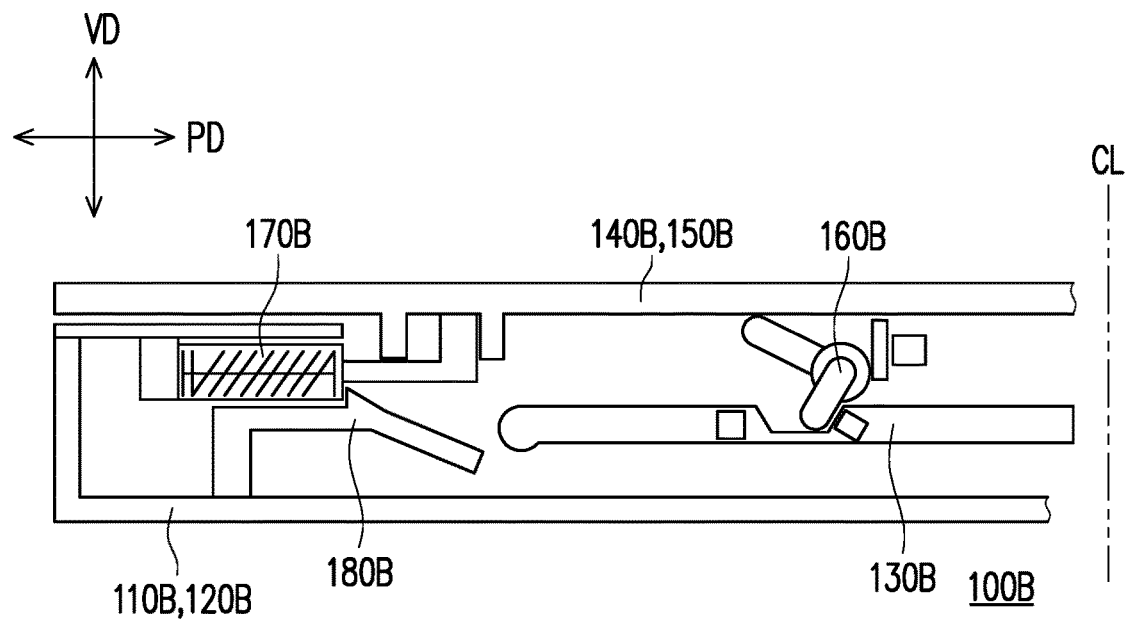
FIG. 7A is a schematic view of certain components in an electronic device with sliding screens according to another embodiment of the invention.
Figure 7B:
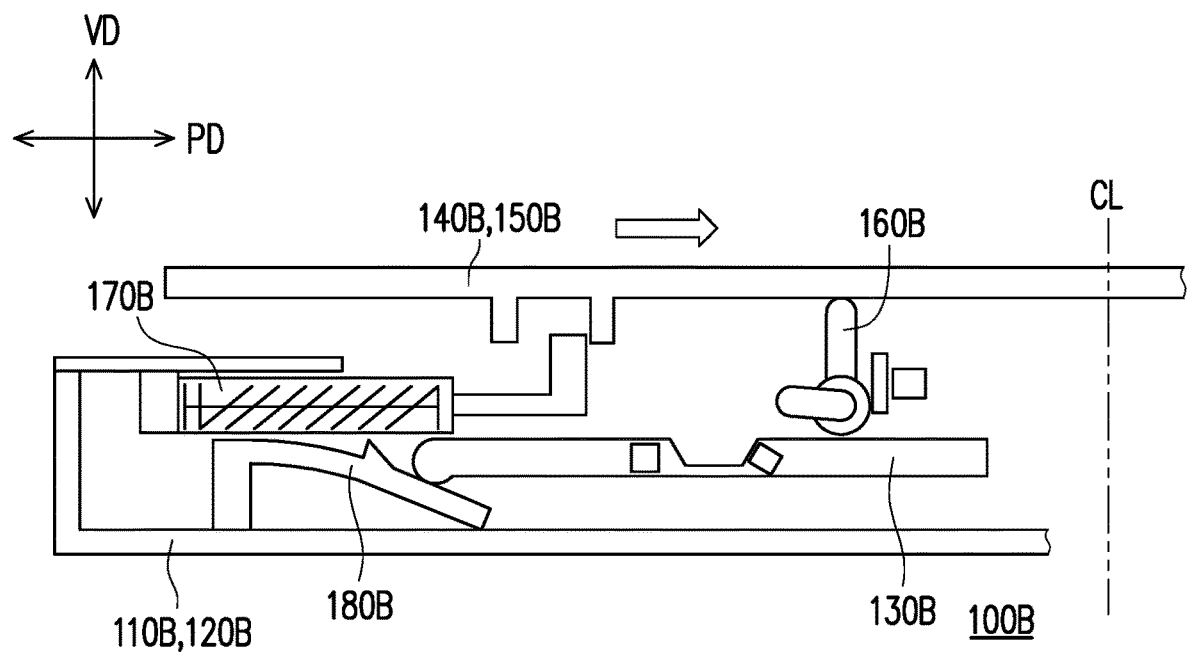
FIG. 7B is a schematic view illustrating translation and lifting operations of the electronic device with sliding screens of FIG. 7A.

FIG. 7A is a schematic view of certain components in an electronic device with sliding screens according to another embodiment of the invention. FIG. 7B is a schematic view illustrating translation and lifting operations of the electronic device with sliding screens of FIG. 7A.

Referring to FIG. 7A and FIG. 7B, an electronic device 100B with sliding screens of this embodiment differs from the electronic device 100 with sliding screens shown by FIG. 1A in that, when a first body 110B and a second body 120B are unfolded to a first angle (e.g., 20 degrees) relative to each other, a first screen 140B moves close to a second screen 150B or the second screen 150B moves close to the first screen 140B, and the first screen 140B is lifted upwards relative to the first surface S1 or the second screen 150B is lifted upwards relative to the second surface S2 (with reference to FIG. 2B). When the first body 110B and the second body 120B are unfolded to a second angle (e.g., 180 degrees) relative to each other, the first screen 140B and the second screen 150B are in contact with each other to cover the hinge modules (with reference to FIG. 2B).

Further, the electronic device 100B with sliding screens of this embodiment has the following two aspects: the first screen 140B passes through a center line CL between the first body 110B and the second body 120B to be in contact with the second screen; the second screen 150B passes through the center line CL between the first body 110B and the second body 120B to be in contact with the first screen.

Referring to FIG. 7A and FIG. 7B, the electronic device 100B includes: at least one translation linking rod 130B, disposed in the first body 110B or the second body 120B; at least one support structure 160B, rotatably disposed in the first body 110B or the second body 120B and located above the at least one translation linking rod 130B; at least one elastic member 170B, disposed in the first body 110B or the second body 120B and contacts the first screen 140B or the second screen 150B; and at least one hook 180B, disposed in the first body 110B or the second body 120B to limit the at least one elastic member 170B.

Referring to FIG. 7A and FIG. 7B, the at least one translation linking rod 130B is adapted to be pushed by an external force to move towards the at least one hook 180B and squeeze the at least one hook 180B to deform it. Meanwhile, during the moving process, the at least translation linking rod 130B can drive the at least one support structure 160B to turn and be in contact with the first screen 140B or the second screen 150B.

In detail, the at least one support structure 160B lifts the first screen 140B or the second screen 150B along a vertical direction VD to be moved relative away from the first body 110B or the second body 120B. The at least one hook 180B is squeezed and elastically deformed to release the at least one elastic member 170B, and the at least one elastic member 170B pushes the first screen 140B or the second screen 150B along a horizontal direction PD. In this way, the effect of translating and lifting the first screen 140B or the second screen 150B may be achieved.

In summary, the electronic device with sliding screens of the invention has the first screen and the second screen that can slide. The first screen and the second screen are adapted to be moved relative to the hinge module individually or synchronously. When the first body and the second body are unfolded relative to each other, the first screen and the second screen may be moved close to each other to achieve a seamless and continuous display effect. In addition, the first screen and the second screen may be lifted upwards to cover the hinge modules, thereby improving the aesthetic level for the electronic device.

Further, the electronic device with sliding screens of the invention can switch between a folded mode (by accommodating the first screen and the second screen in the first body and the second body), a tablet mode (by making the first screen and the second screen coplanar with each other) or a tent mode (by making the first body and the second body unfolded to less than 180 degrees) to meet the user's viewing and operating requirements.

The invention claimed is:

1. An electronic device with sliding screens, comprising:
a first body, having a first surface;
a second body, having a second surface;
a plurality of hinge modules, connected between the first body and the second body;
a first screen, slidably disposed on the first surface of the first body; and
a second screen, slidably disposed on the second surface of the second body,
wherein the first screen and the second screen are adapted to be moved relatively close and gradually lifted upwards when the first body and the second body are unfolded to a first angle relative to each other, the first screen and the second screen are in contact with each other to cover the hinge modules when the first body and the second body are unfolded to a second angle relative to each other, and the first screen and the second screen are adapted to be stacked in parallel and moved away from the hinge modules when the first body and the second body are folded relative to each other.

2. The electronic device with sliding screens according to claim 1, wherein the first body has a plurality of first grooves formed on and penetrating the first surface, the first screen has a plurality of first sliders respectively and slidably disposed in the first grooves, and the first sliders are adapted to slide linearly along the first grooves.

3. The electronic device with sliding screens according to claim 2, further comprising: a plurality of first translation bases and a plurality of first lifting bases, the first translation bases being disposed in the first body and relatively away from the hinge modules, the first lifting bases being disposed in the first body and relatively close to the hinge modules, each of the first translation bases having a horizontal track, each of the first lifting bases having a curved track, a plurality of first plugs of the first sliders being respectively and movably inserted to the horizontal tracks and the curved tracks.

4. The electronic device with sliding screens according to claim 3, wherein when the first body and the second body are unfolded relative to each other, the first screen slides towards the second screen along the horizontal tracks and the curved tracks through the first sliders, and the first screen is lifted relative to the first surface to form a first included angle.

5. The electronic device with sliding screens according to claim 1, wherein the second body has a plurality of second grooves formed on and penetrating the second surface, the second screen is slidably connected in the second grooves, and the second screen is adapted to slide linearly along the second grooves.

6. The electronic device with sliding screens according to claim 5, further comprising: a plurality of second translation bases and a plurality of second lifting bases, the second translation bases being disposed in the second body and relatively away from the hinge modules, the second lifting bases being disposed in the second body and relatively close to the hinge modules, each of the second translation bases having a horizontal track, each of the second lifting bases having a curved track, a plurality of second plugs of the second sliders being respectively and movably inserted to the horizontal tracks and the curved tracks.

7. The electronic device with sliding screens according to claim 6, wherein when the first body and the second body are unfolded relative to each other, the second screen slides towards the first screen along the horizontal tracks and the curved tracks through the second sliders, and the second screen is lifted relative to the second surface to form a second included angle.

8. The electronic device with sliding screens according to claim 1, further comprising: a plurality of linkage assemblies respectively disposed in the first body and the second body and respectively connected to the corresponding hinge modules, the linkage assemblies linking the first screen and the second screen, the hinge modules synchronously driving the first screen and the second screen through the linkage assemblies to move relatively close to a center line between the first body and the second body when the first body and the second body are unfolded relative to each other, the hinge modules synchronously driving the first screen and the second screen through the linkage assemblies to move relatively away from the center line between the first body and the second body when the first body and the second body are folded relative to each other.

9. The electronic device with sliding screens according to claim 8, wherein each of the hinge modules comprises:
a torque member;
two rotating shafts, rotatably inserted to the torque member and parallel to each other;
two driving rings, respectively and movably sleeved on the two rotating shafts and connected to the corresponding linkage assemblies; and
two inner rings, respectively sleeved on the two rotating shafts, each of the inner rings contacting one side of the respective driving ring facing towards the torque member;
two outer rings, respectively sleeved on the two rotating shafts, each of the outer rings contacting one side of the respective driving ring facing away from the torque member; and
two brackets, respectively disposed on the two rotating shafts and connected to the first body and the second body,
wherein the inner rings and the outer rings drive the driving rings to move relatively away from the torque member along the rotating shafts when the first body and the second body are unfolded relative to each other, and the inner rings and the outer rings drive the driving rings to move relatively close to the torque member along the rotating shafts when the first body and the second body are folded relative to each other.

10. The electronic device with sliding screens according to claim 9, wherein each of the linkage assemblies comprises a linking rod, a linking bracket and a driving bracket, a first end of the linking rod is pivotally connected to the corresponding driving ring, the linking bracket is pivotally connected to a second end of the linking rod and adapted to move along a first direction parallel to the rotating shafts, the driving bracket is slidably connected to the linking bracket and adapted to move along a second direction perpendicular to the first direction, and the linking bracket is connected to the first screen or the second screen.

11. The electronic device with sliding screens according to claim 1, wherein the first screen and the second screen respectively include a first curved portion and a second curved portion, the first curved portion and the second curved portion face the hinge modules when the first body and the second body are folded relative to each other, and the first curved portion and the second curved portion are moved close to each other towards a center line between the first body and the second body when the first body and the second body are unfolded relative to each other.

12. The electronic device with sliding screens according to claim 1, further comprising:
at least one translation linking rod, disposed in the first body or the second body;
at least one support structure, rotatably disposed in the first body or the second body and located above the at least one translation linking rod;
at least one elastic member, disposed in the first body or the second body and contacting the first screen or the second screen; and
at least one hook, disposed in the first body or the second body to limit the at least one elastic member,
wherein the at least translation linking rod is adapted to move towards the at least one hook to drive the at least one support structure to turn and be in contact with the first screen or the second screen.

13. The electronic device with sliding screens according to claim 12, wherein the at least one support structure lifts the first screen or the second screen along a vertical direction to be moved relative away from the first body or the second body, the at least one hook is elastically deformed to release the at least one elastic member, and the at least one elastic member pushes the first screen or the second screen along a horizontal direction.

14. An electronic device with sliding screens, comprising:
a first body, having a first surface;
a second body, having a second surface;
a plurality of hinge modules, connected between the first body and the second body;
a first screen, disposed on the first surface of the first body; and
a second screen, disposed on the second surface of the second body,
wherein the first screen moves close to the second screen or the second screen moves close to the first screen and the first screen is lifted upwards relative to the first surface or the second screen is lifted upwards relative to the second surface when the first body and the second body are unfolded to a first angle relative to each other, and the first screen and the second screen are in contact with each other to cover the hinge modules when the first body and the second body are unfolded to a second angle relative to each other.

15. The electronic device with sliding screens according to claim 14, wherein the first screen passes through a center line between the first body and the second body to be in contact with the second screen.

16. The electronic device with sliding screens according to claim 14, wherein the second screen passes through a center line between the first body and the second body to be in contact with the first screen.

17. The electronic device with sliding screens according to claim 15, wherein the first screen and the second screen respectively include a first curved portion and a second curved portion, the first curved portion and the second curved portion face the hinge modules when the first body and the second body are folded relative to each other, and the first curved portion passes through the center line when the first body and the second body are unfolded relative to each other.

18. The electronic device with sliding screens according to claim 16, wherein the first screen and the second screen respectively include a first curved portion and a second curved portion, the first curved portion and the second curved portion face the hinge modules when the first body and the second body are folded relative to each other, and the second curved portion passes through the center line when the first body and the second body are unfolded relative to each other.

19. The electronic device with sliding screens according to claim 14, further comprising:
a translation linking rod, disposed in the first body or the second body;
a support structure, rotatably disposed in the first body or the second body and located above the translation linking rod;
an elastic member, disposed in the first body or the second body and contacting the first screen or the second screen; and
a hook, disposed in the first body or the second body to limit the elastic member,
wherein the translation linking rod is adapted to move towards the hook to drive the support structure to turn and be in contact with the first screen or the second screen.

20. The electronic device with sliding screens according to claim 19, wherein the support structure lifts the first screen or the second screen along a vertical direction to be moved relative away from the first body or the second body, the hook is elastically deformed to release the elastic member, and the elastic member pushes the first screen or the second screen along a horizontal direction.

* * * * *